US012734723B2

(12) United States Patent
Hasch et al.

(10) Patent No.: US 12,734,723 B2
(45) Date of Patent: Sep. 15, 2026

(54) METHOD FOR PRODUCING A WOODEN COMPOSITE BOARD, AND DEVICE FOR PRODUCING A WOODEN COMPOSITE BOARD

(71) Applicant: SWISS KRONO Tec AG, Lucerne (CH)

(72) Inventors: Joachim Hasch, Berlin (DE); Norbert Kalwa, Horn-Bad Meinberg (DE); Georg Seidack, Herzberg (DE)

(73) Assignee: SWISS KRONO TEC AG, Lucerne (CH)

( * ) Notice: Subject to any disclaimer, the term of this patent is extended or adjusted under 35 U.S.C. 154(b) by 166 days.

(21) Appl. No.: 18/694,117

(22) PCT Filed: Oct. 14, 2022

(86) PCT No.: PCT/EP2022/078655
§ 371 (c)(1),
(2) Date: Mar. 21, 2024

(87) PCT Pub. No.: WO2023/066802
PCT Pub. Date: Apr. 27, 2023

(65) Prior Publication Data

US 2024/0391131 A1 Nov. 28, 2024

(30) Foreign Application Priority Data

Oct. 18, 2021 (EP) .................................... 21203262

(51) Int. Cl.
*B27K 3/02* (2006.01)
*B27K 3/10* (2006.01)
(Continued)

(52) U.S. Cl.
CPC .............. *B27K 3/0285* (2013.01); *B27K 3/10* (2013.01); *B27N 3/18* (2013.01); *B27N 9/00* (2013.01); *B27K 2240/30* (2013.01)

(58) Field of Classification Search
None
See application file for complete search history.

(56) References Cited

U.S. PATENT DOCUMENTS

2018/0243936 A1* 8/2018 Stahl ...................... B27K 3/025
2018/0243963 A1 8/2018 Stahl
(Continued)

FOREIGN PATENT DOCUMENTS

CN 101214672 A 7/2008
CN 112440347 A 3/2021
(Continued)

OTHER PUBLICATIONS

International Search Report issued on Mar. 31, 2023 in corresponding Application No. PCT/EP2022/078655, 6 pages.
(Continued)

*Primary Examiner* — Michael P. Rodriguez
(74) *Attorney, Agent, or Firm* — Andrew M. Calderon; Calderon Safran & Wright P.C.

(57) ABSTRACT

The disclosure relates to a method for producing a wood-based material panel with the steps: producing a raw wood-based material panel which includes a first lateral surface and a second lateral surface that runs parallel to the first lateral surface, and edge surfaces that connect the lateral surfaces to each other; applying a liquid containing a flame retardant at least to the first lateral surface; and applying a negative pressure to the second lateral surface so that the liquid containing the flame retardant is sucked into a peripheral zone of the raw wood-based material panel, and/or applying an overpressure to the first lateral surface so that
(Continued)

the liquid containing the flame retardant is pressed into a peripheral zone of the raw wood-based material panel, resulting in the wood-based material panel.

20 Claims, 6 Drawing Sheets

(51) Int. Cl.

| | |
|---|---|
| ***B27N 3/18*** | (2006.01) |
| ***B27N 9/00*** | (2006.01) |

(56) References Cited

U.S. PATENT DOCUMENTS

| | | | | |
|---|---|---|---|---|
| 2018/0372651 | A1* | 12/2018 | Kalwa .................... | B27N 3/143 |
| 2021/0189245 | A1 | 6/2021 | Rodriguez et al. | |

FOREIGN PATENT DOCUMENTS

| | | | | |
|---|---|---|---|---|
| EP | 2168738 | A1 | 3/2010 | |
| EP | 2623282 | A1 | 8/2013 | |
| EP | 3127670 | A2 * | 2/2017 | ............. B27N 1/029 |
| EP | 3388213 | A2 | 10/2018 | |
| JP | 11226912 | A | 8/1999 | |

OTHER PUBLICATIONS

First Examination Opinion Notice issued on Sep. 26, 2025, in corresponding CN Application No. 202280077701.8, 12 Pages.

* cited by examiner

METHOD FOR PRODUCING A WOODEN COMPOSITE BOARD, AND DEVICE FOR PRODUCING A WOODEN COMPOSITE BOARD

FIELD OF INVENTION

The invention relates to a method for producing a wood-based material panel.

According to a second aspect, the invention relates to a wood-based material panel production device with (a) a press, especially a belt press, for pressing at least one primary product layer to produce a raw wood-based material panel, (b) a liquid application device for applying a liquid to the raw wood-based material panel and (c) a suction device that is designed to apply a negative pressure to a lateral surface of the wood-based material panel.

BACKGROUND

Such methods and wood-based material panel production devices are known and serve to produce wood-based material panels. In order to be able to use renewable raw materials such as wood as building materials, it is often required that they are flame-retardant.

The production of flame-retardant wood-based material panels has been known for several decades. In the process, the primary products, such as wood chips, wood fibers or coarse chips, are treated with a liquid containing a flame retardant prior to the production of the primary product layer made of the primary products. This is achieved by spraying the primary products in mixers, coils or blow lines. The primary products are then scattered onto a belt, resulting in at least one primary product layer. The primary product layer is subsequently pressed to create a wood-based material panel.

The disadvantage of this approach is that it produces a comparatively large amount of reject, as the flame retardant content of the wood-based material panel is often not high enough, particularly at the start of production.

EP 3 388 213 A2 describes a method for producing a flame-retardant and/or solidified wood fiber panel. First, a cut wood fiber panel is arranged on a processing device. A flame retardant and/or solidifying agent is then applied to an upper side of the wood fiber panel. The applied agent is sucked or pressed into the wood fiber panel by applying a negative pressure to the lower side and/or by applying an overpressure to the upper side.

EP 3 127 670 A2 discloses a method for impregnating wood fiber panels, in which material boards rest on a transport device as an endless strand. The strand is continuously guided through an impregnation station for introducing an impregnating agent into the wood fiber panel from above. The impregnating agent is applied by means of a number of application devices, which are arranged at least in one row across the entire width of the individual material panel or the continuous material panel strand and can be controlled individually, in a time-controlled manner during the continued transport of the individual material panels of the strand or the continuous material panel strand. The impregnated material panels only exhibit the impregnation at the points where it is necessary in order to obtain the desired useful properties.

EP 2168 738 A1 describes a method for producing a wood fiber panel, comprising the steps: pressing a fiber fleece to produce a raw wood fiber panel, applying an aqueous liquid at least to parts of an upper side of the raw wood fiber panel, and applying a negative pressure at least to parts of the lower side by means of a suction table so that the aqueous liquid is sucked into and/or through the raw wood fiber panel.

SUMMARY

The invention aims to improve the production of flame-retardant wood-based material panels.

The invention solves the problem by way of a method for producing a wood-based material panel with the steps (a) producing a raw wood-based material panel, in particular by pressing primary products that contain wood, which comprises a first lateral surface and a second lateral surface that runs parallel to the first lateral surface, (b) applying a liquid containing a flame retardant at least to the first lateral surface and (c) applying a negative pressure to the second lateral surface so that the liquid containing the flame retardant is sucked into the raw wood fiber panel, in particular into a subsurface, and/or applying a negative pressure to the first lateral surface so that the liquid containing the flame retardant is pressed into a subsurface of the raw wood-based material panel, resulting in the wood-based material panel.

The invention also solves the problem by way of a wood-based material panel production device according to the preamble in which the liquid contains a flame retardant and in which the suction device is designed to automatically apply the negative pressure for such a suction time that the liquid containing the flame retardant is sucked into a subsurface of the raw wood-based material panel but not through the raw wood-based material panel and/or which has a pressure application device for applying an overpressure to the first lateral surface so that the liquid containing the flame retardant is pressed into a subsurface of the raw wood-based material panel.

According to a third aspect, the invention solves the problem by way of a wood-based material panel that has a concentration gradient of flame retardant, especially a continuous gradient, wherein the flame retardant concentration reduces as the distance from a surface to a center of the wood-based material panel increases. It is beneficial if the wood-based material panel is flame-retardant in accordance with the specification standard DIN EN 13501-1:2010 and the test standard DIN EN 13823:2015. It is especially beneficial if the wood-based material panel is a wood-based material panel in Class B, in particular B-s1 or B-s1 d0, or C, in particular C-s1, C-s1 d0, or $B_{fl}$, in particular $B_{fl}$-s1 or $B_{fl}$-s1 d0, or $C_{fl}$, in particular $C_{fl}$-s1, $C_{fl}$-s1 D0, or Class B1, B2 or B3.

By introducing the flame retardant by means of the liquid containing flame retardant after pressing, the amount of flame retardant in the wood-based material panel can often be adjusted with high process reliability. This reduces reject when compared to methods from the prior art.

A further advantage of the invention is that the consumption of flame retardant can generally be reduced. In the known method of manufacturing flame-retardant wood-based material panels, flame retardant is lost when the primary products are sprayed and during subsequent transportation of the sprayed primary products. Losses of more than 20% of flame retardant often occur.

This is particularly true in the case of wood-based material panels that are not made of defined surface and middle layers and that are also manufactured separately. In this case, the entirety of the wood material used to manufacture the panel has to be treated with flame retardant. Given that the surface layers typically make up 30 to 40% of the wood-based material panel, 60 to 70% of the flame retardant is wasted. This is especially true of MDF and HDF panels.

A further advantage is that the introduction of the flame retardant does not generally lead to an increase in the moisture level of the comminuted primary product. An increased moisture level can lead to so-called steam cracks in the press, which is undesirable. A steam crack is an area in which the wood-based material panel is cracked by evaporating water.

Furthermore, increasing the proportion of binder, i.e. the binding agent and/or proportion of adhesive on the primary product layer, is generally not necessary when flame retardant is introduced. Many binders, such as polymeric methylene diphenyl diisocyanate, react with some flame retardants. In methods according to the prior art it is therefore necessary to add more binder when flame retardant is used than when a wood-based material panel is manufactured without flame retardant. This disadvantage is generally eliminated during production according to the invention.

In addition, it is beneficial that, unlike in methods according to the prior art, a press speed does generally not have to be reduced. Since, in the prior art, the flame retardant is introduced in a liquid prior to pressing, the moisture level of the primary product layer often increases. In order to prevent steam cracks, the press speed and/or press temperature normally has to be reduced. This can be eliminated in a method according to the invention.

Furthermore, the method according to the invention can at least fundamentally be carried out independently of the time and location of production of the raw wood-based material panel. It is therefore possible to make previously produced, non-flame-retardant raw wood-based material panels flame-retardant at a later point in time. In particular, the flame retardant is applied to the previously pressed raw wood-based material panel. It is therefore possible and provided for according to a preferred embodiment of the invention for the raw wood-based material panel to be stored and/or moved for a longer period following pressing, in particular at least one minute, in particular at least 10 minutes, before the flame-retardant liquid is applied.

For example, the raw wood-based material panels are stored in a star cooler. This enables flexible production of flame-retardant wood-based material panels, especially in small quantities. However, it is also possible and included in the invention for the liquid application device to be arranged close to the press. Preferably, a distance between the liquid application device and the press is at most 100 m or at most 50 m, in particular at most 30 m.

Within the scope of the present description, a raw wood-based material panel refers particularly to a panel made of wood-based material that can be processed to produce a wood-based material panel by introducing the flame retardant.

The application of liquid is understood particularly to mean that the liquid is brought into contact with the first lateral surface. A liquid film preferably forms on the lateral surface in the process.

The subsurface refers to an area of the raw wood-based material panel which is limited on the one side by a lateral surface and does not extend to the center of the wood-based material panel on the other. The feature that the liquid is sucked into the subsurface is understood particularly to mean that it is possible, but not essential, for the liquid to be sucked exclusively into the subsurface.

The application of liquid on the raw wood-based material panel is understood particularly to mean that the liquid is brought into contact with an upper side of the raw wood-based material panel. The liquid can be brought into contact with the raw wood-based material panel from above or below.

According to a preferred embodiment, the liquid application device is designed and/or arranged to apply the liquid to the raw wood-based material panel from below.

In this case, it is beneficial if the suction device is arranged to automatically apply the negative pressure from above.

The raw wood-based material panel is, for example, a medium-density fiberboard (MDF panel), a high-density fiberboard (HDF panel), an oriented strand board (OSB panel), a chipboard, a plywood board, a soft fiberboard, a hard fiberboard, a bent plywood board, a multiplex board, a blockboard, a glued wood board, a low-density fiberboard (LDF panel) or an insulating board.

A thickness of the wood-based material panel is preferably at least 6 mm, especially at least 10 mm, especially preferably at least 15 mm, especially preferably at least 20 mm. Alternatively or additionally, the thickness of the wood-based material panel is preferably at most 50 mm, especially at most 30 mm, especially preferably at most 28 mm, preferably at most 25 mm.

The liquid containing flame retardant contains a flame retardant. The liquid is preferably an aqueous liquid. It is beneficial if the flame retardant contains phosphorus. The flame retardant may contain organic and/or inorganic phosphorus compounds, such as phosphate, polyphosphate, phosphonate and/or a guanidine salt. It is possible that the flame retardant has a base of melamine or melamine derivatives, aluminium hydroxide or alkaline sulphates. However, it is preferable if the boron content of the flame retardant is a maximum of one percent by weight. The flame retardant preferably contains ammonia.

The wood-based material panel produced is preferably flame-retardant in accordance with DIN EN 13501-1:2010. In particular, the wood-based material panel produced has the properties of a wood-based material panel according to the invention.

It is beneficial if a raw density of the raw wood-based material panel and/or the wood-based material panel is at least 550 kg/cubic meter, in particular at least 600 kg/cubic meter. The raw density of the raw wood-based material panel and/or the wood-based material panel is preferably at most 1000 kg/cubic meter, in particular at most 800 kg/cubic meter. However, it may also be beneficial if the raw density of the raw wood-based material panels is below 350 kg/cubic meter, for example below 300 kg/cubic meter. This is particularly the case when the raw wood-based material panel is an insulating material panel.

The application of the liquid containing a flame retardant and/or the application of the negative pressure can be carried out on both a moving and a stationary raw wood-based material panel.

Preferably, the overpressure is applied locally and the liquid containing flame retardant is introduced in the area of overpressure. Local application of the overpressure is understood to mean that the overpressure is not applied across the entire surface of the wood-based material panel. For example, the surface to which the overpressure is applied is smaller than half of the entire surface of the wood-based material panel.

Preferably, an applicator is pressed onto the raw wood-based material panel so that an introduction chamber forms between the applicator and the raw wood-based material panel that is sealed by a seal of the applicator. In this way, a leakage flow of pressurized fluid, by means of which pressure is built up in the introduction chamber, is reduced.

The applicator is preferably part of the liquid application device.

To maintain the sealing effect, the applicator is pressed against the raw wood-based material panel. This is preferably done from below. Alternatively, the application is pressed against the raw wood-based material panel from above.

The liquid containing flame retardant is preferably pressed or introduced into the introduction chamber. It is beneficial if the liquid containing flame retardant fills at least half, but preferably at least 75%, of the volume of the introduction chamber during pressing. The gas volume in the introduction chamber is thus kept small and the introduction pressure in the introduction chamber for the pressing process can be rapidly increased and decreased. Once the liquid containing flame retardant has been pressed into the introduction chamber and thus into the raw wood-based material panel, the introduction pressure is reduced, in particular to the ambient pressure.

The applicator is preferably moved relative to the raw wood-based material panel after the introduction pressure has been reduced. The applicator is then pressed once again against the raw wood-based material panel and more liquid containing flame retardant is pressed into the introduction chamber. The introduction pressure is subsequently reduced and the steps are repeated until the raw wood-based material panel has flame retardant on all prescribed surfaces.

To facilitate the introduction of the liquid containing flame retardant into the raw wood-based material panel, a negative pressure is applied to the raw wood-based material panel, preferably from above, but alternatively from below. This is preferably done in the area in which an overpressure is applied from the other side of the raw wood-based material panel. In other words, a negative pressure is applied to a lateral surface, which corresponds to a pressure surface where the liquid containing flame retardant is pressed in. The application of the negative pressure is achieved by means of the suction device.

It is possible, but not essential, for the applicator to be moved relative to the raw wood-based material panel while the liquid containing flame retardant is being pressed in. It is also possible that the raw wood-based material panel and the applicator are moved at the same time so that the applicator remains stationary relative to the raw wood-based material panel but is moved in space.

The suction device preferably has a suction cup that can be automatically positioned at a point that can be preset. The suction device is preferably designed so that the suction cup is always arranged opposite the applicator. To this end, a drive of the suction cup, which can be referred to as a positioning drive, is controlled by a control unit of the wood-based material panel production device.

A suction cup refers to a component which forms a sealed cavity when it rests on the raw wood-based material panel, wherein a negative pressure can be applied to said cavity. It is possible, but not essential, for the walls of the suction cup to be elastic, especially entropy-elastic; however, they may also be rigid. The suction cup preferably has a seal with which it rests against the wood-based material panel.

Preferably, the negative pressure is applied in such a way that an inner concentration of flame retardant in an inner thickness quintile of a thickness direction from the first lateral surface to the second lateral surface of the wood-based material panel is at most 0.8 times an outer concentration in a first outermost thickness quintile that extends to the first lateral surface. It is beneficial if the inner concentration is at most 0.7 times, especially 0.6 times, preferably 0.5 times, especially preferable 0.4 times, especially 0.3 times, especially preferably 0.2 times, for example at most 0.1 times, the outer concentration.

To determine the inner concentration of flame retardant, a cuboid, the base area of which has the dimensions 5 cm by 5 cm, is cut out of the wood-based material panel.

The base area extends parallel to the first lateral surface. Subsequently, slices are cut off on both sides parallel to the lateral surface, the thickness of each slice being 0.2 times the thickness of the wood-based material panel. The mass of flame retardant for the sample obtained in this manner is determined and divided by the overall mass of the sample. This provides the inner concentration.

The outer concentration is obtained by analyzing the material of a slice that is 0.2 times as thick as the thickness of the wood-based material panel, a side of the slice being the first lateral surface.

If the wood-based material panel is an oriented strand board (OSB panel), the concentration of flame retardant in at least one surface layer is at least 65% higher, preferably at least 50% higher, in particular at least 100% higher, than the concentration of flame retardant in a middle layer. The middle layer is arranged between the two surface layers. The surface layer results from a layer of primary products that has been scattered separately from another layer, from which the middle layer is created during pressing.

It is beneficial if the application of the liquid is carried out in such a way that the subsurface of at least 80%, especially at least 90%, of a lateral surface area of the wood-based material panel contains flame retardant. In other words, a maximum of 10% of the wood-based material panel contains no flame retardant in its subsurface.

This reduces the amount of material panel that has to be discarded for not containing enough flame retardant.

In particular, the flame retardant is also introduced outside of the peripheral area of the wood-based material panel. The peripheral area comprises all points of the wood-based material panel whose distance to the edge of the wood-based material panel is at most 10 cm.

The liquid can be applied by spraying, rinsing, brushing, rolling, pouring or other means. Spraying may be done, for example, by means of an overpressure, wherein the liquid is pressed through a nozzle. Alternatively, spraying can be done through atomization. In particular, the liquid can be applied to a moving, particularly a rotating or vibrating, body so that droplets form.

It is beneficial if a concentration of flame retardant in the liquid corresponds to at least half, in particular at least 65%, of the solubility of the flame retardant. At the temperature at which the liquid hits the raw wood-based material panel, the flame retardant has a solubility that can be measured, for example, in grams per liter. This solubility is the maximum mass of flame retardant that can be in solution per unit volume of liquid. The concentration of flame retardant in the liquid is at least half of this solubility. As a result, only a small amount of liquid has to be applied to the raw wood-based material panel. In other words, the quotient from the actual concentration of the flame retardant in accordance with DIN 1310 and solubility is at least 0.5, in particular at least 0.65, preferably at least 0.75.

Preferably, a concentration of flame retardant in the liquid is at least 30 percent by weight, in particular at least 40 percent by weight, preferably at least 50 percent by weight.

The liquid is preferably a solution, especially an aqueous solution, or a suspension, especially an aqueous suspension.

The liquid preferably contains at least one coloring agent. The coloring agent is preferably selected in such a way that a content of flame retardant can be determined from the color of a cross-section of the wood-based material panel, in particular in a time-resolved manner.

For example, the coloring agent is a fluorescent coloring agent such that the amount of flame retardant can be concluded by irradiating the cross-section of the wood-based material panel with excitation light and by the time-resolved measurement of an intensity of the resulting fluorescence radiation. This renders quality control particularly easy.

Preferably, the liquid temperature of the liquid when applied to the lateral surface is at least 40° C., especially at least 50° C., especially preferably at least 60° C. The solubility of flame retardants generally increase at higher temperatures. As a result, a higher temperature means that less liquid is required to apply a given amount of flame retardant. It is beneficial if the temperature is lower than 100° C., in particular lower than 90° C.

According to a preferred embodiment, a surface temperature of the first lateral surface is at least 30° C., especially at least 40° C. during application of the liquid. Alternatively or additionally, the surface temperature is preferably at most 65° C., especially at most 50° C. It is beneficial if the surface temperature is at most 20° C., especially 10° C., lower than the liquid temperature. The surface temperature is preferably at least as high as the liquid temperature. In this case, the flame retardant does not precipitate out of the liquid and the flame retardant can be sucked into the subsurface.

At the point where the liquid containing flame retardant is applied, the surface temperature of the first lateral surface is preferably lower than the liquid temperature. For example, a difference between the surface temperature and the liquid temperature is preferably at least 5 Kelvin, in particular at least 10 Kelvin. Flame retardant generally does not dissolve well in solvent, especially in water. However, solubility increases with temperature. In order to introduce as little water as possible into the raw wood-based material panel, the temperature of the liquid containing flame retardant is selected to be higher than the surface temperature. Upon penetration into the raw wood-based material panel The introduction of the flame retardant into the raw wood-based material panel is especially effective when, at the point where the liquid containing the flame retardant is applied, the concentration of flame retardant in the liquid at the surface temperature of the first lateral surface is higher than a saturation concentration of the flame retardant in the liquid. In this case, the flame retardant precipitates out of the solution shortly after the liquid containing flame retardant comes into contact with the raw wood-based material panel, which causes an especially high concentration of flame retardant in the outer areas of the raw wood-based material panel.

An area-specific application amount of liquid is preferably at least 0.3 kg/square meter and/or at most 5 kg/square meter.

It is beneficial if the area-specific application amount of liquid, which is measured in liters per square meter for example, is selected in such a way that a surface layer moisture level of a surface layer of the wood-based material panel deviates from the core moisture level by at most 30% after the liquid has been sucked into the subsurface. When the at least one primary product is pressed to create the raw wood-based material panel, the raw wood-based material panel loses water in the subsurface due to evaporation. This leads to a moisture gradient in the raw wood-based material panel, which is undesirable. By applying the liquid containing flame retardant, the loss in moisture in the subsurface can at least be partially offset. As a result, an otherwise necessary post-treatment, for example in a climate chamber, can generally be omitted.

The negative pressure is preferably at least 100 hPa, particularly at least 150 hPa, preferably at least 200 hPa, especially preferably at least 300 hPa. This is to be understood to mean that the pressure deviates from the ambient pressure by at least 300 hPa. It is beneficial if the negative pressure is at least 400 hPa. For example, the pressure is at least 50 hPa and/or at most 700 hPa.

According to a preferred embodiment, the method comprises the steps: (a) rotating the raw wood-based material panel after the liquid has been sucked into the subsurface of the first lateral surface, (b) applying the liquid to the second lateral surface and (c) applying a negative pressure to the first lateral surface so that the liquid is sucked into the subsurface of the second lateral surface of the raw wood-based material panel, resulting in the wood-based material panel. In other words, the treatment with the solution containing flame retardant is performed from both sides.

It is beneficial if the method comprises the steps (a) scattering a first surface chip layer, (b) scattering at least one middle chip layer on top of the latter, (c) scattering a second surface chip layer on the middle chip layer, and (d) pressing the layers to form a raw wood-based material panel that comprises a first surface layer resulting from the first surface chip layer, a middle layer resulting from the middle chip layer, and a second surface layer resulting from the second surface chip layer.

The method preferably comprises the step (d1) applying the liquid containing flame retardant with an area-specific application amount of liquid, which corresponds to at least 10 percent by weight of an area-specific mass of the first surface layer.

Alternatively or additionally, the method preferably comprises the step (d2) applying the liquid containing flame retardant with an area-specific application amount of flame retardant, which corresponds to at least 10 percent by weight of an area-specific mass of the surface layer. It has been proven that this generally results in a flame-retardant wood-based material panel.

It is beneficial if the first surface chip layer and/or the second surface chip layer is made of coarse chips. Alternatively or additionally, at least one surface chip layer can be made of fine chips.

Alternatively or additionally, the middle chip layer is made of coarse chips. However, the first surface chip layer and/or the second surface chip layer need not be made of coarse chips; they can also be made of other primary products that contain wood. The same applies for the middle chip layer.

Preferably, the coarse chips do not contain flame retardant or they contain such a small concentration of flame retardant that the proportion of flame retardant introduced into the wood-based material panel via the coarse chips corresponds to at most 50 percent by weight, in particular at most 30 percent by weight, preferably at most 10 percent by weight, of all the flame retardant contained in the wood-based material panel.

A wood-based material panel production device according to the invention preferably has a pressure application device for applying the overpressure to a pressure surface. The pressure surface is the surface which can be subjected to an overpressure by means of the pressure application device. The pressure surface is preferably, but not necessarily, at most 50% of a surface of the wood-based material panel.

The wood-based material panel production device preferably comprises a control unit that is configured to control components of the wood-based material panel production device such that a method according to the preamble is carried out automatically.

The wood-based material panel production device preferably has an applicator that has a seal. The applicator is designed to press against the raw wood-based material panel so that an introduction chamber is formed between the applicator and the raw wood-based material panel, said chamber being sealed by the seal.

Preferably, the applicator has an actuator, such as a hydraulic cylinder, a pneumatic cylinder or an electric drive, for pressing the applicator against the raw wood-based material panel. The wood-based material panel production device may have a positioning device, for example a robot, for positioning the applicator.

In the case of a wood-based material panel according to the invention, an inner concentration of flame retardant in an inner thickness quintile of a thickness expansion from the first lateral surface to the second lateral surface is at most 0.8 times, especially at most 0.6 times, especially preferably at most half, especially at most 0.4 times, preferably at most 0.3 times and especially preferably at most 0.1 times, an outer concentration in a first outer thickness quintile that extends to the first lateral surface. In other words, the inner concentration of flame retardant is significantly lower than the concentration of flame retardant in the subsurface that is adjacent to the lateral surface. It has been proven that the flame retardant is particularly effective at this point.

It is beneficial if a second-decile concentration of flame retardant in a second thickness decile of the thickness expansion is at least 0.1 times a first-decile concentration in the first outermost thickness decile. In other words, there is not only flame retardant in the outermost decile, but flame retardant is also introduced further into the interior of the raw wood-based material panel.

If the wood-based material panel is a coarse chipboard, as intended according to a preferred embodiment, it is preferably a fireproof building panel. In particular, this coarse chipboard (i.e. oriented strand board, OSB) is designed to be installed inside buildings. If the wood-based material according to the invention is an HDF panel, it can be used, for example, as floor, wall or ceiling covering.

A wood-based material panel according to the invention in the form of an MDF panel is suitable for use as a door panel or furniture front, for example.

The invention also includes an insulating element, such as a façade-insulating element, which has at least one layer composed of a wood-based material panel according to the invention.

BRIEF DESCRIPTION OF DRAWINGS

In the following, the invention will be explained in more detail with the aid of the accompanying drawings. They show.

DETAILED DESCRIPTION

Figure 1:
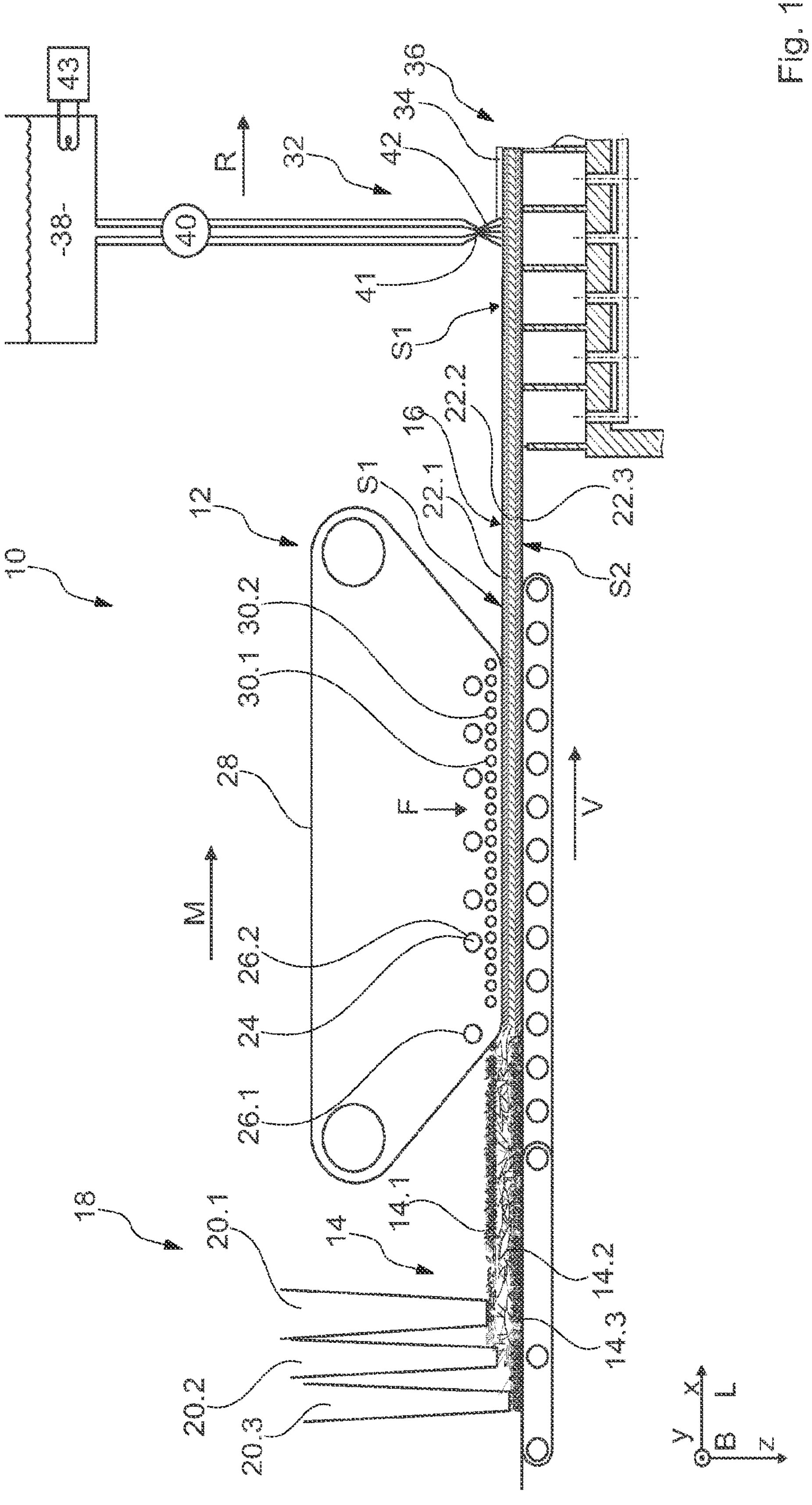
FIG. 1 is a schematic view of a wood-based material panel production device according to the invention for carrying out a method according to the invention for producing a wood-based material panel according to the invention.

FIG. 1 schematically depicts a wood-based material panel production device 10 that comprises a press 12 in the form of a continuous belt press for pressing at least one primary product layer 14, in the present case three primary product layers 14.*i*, to form a raw wood-based material panel 16. The at least one primary product layer 14 is created by a scattering device 18.

In the present case, the scattering device 18 comprises a first scatterer 20.1 for scattering a first primary product layer 14.1 in the form of a first surface chip layer, a second scatterer 20.2 for scattering a second primary product layer 14.2 in the form of a middle chip layer and a third scatterer 20.3 for scattering a third primary product layer 14.3 in the form of a second surface chip layer.

After being pressed by the press 12, the resulting raw wood-based material panel 16 has a first surface layer 22.1, a middle layer 22.2 and a second surface layer 22.3.

The press 12 is heated, for example, by means of a thermofluid 24, which flows in heating pipes 26.1, 26.2, . . . . The heat of the thermofluid 24 is transferred to a circulating press belt 28, which presses onto the primary product layers 14.*i* by means of pressure rollers 30.1, 30.2, . . . .

A liquid application device 32 is arranged downstream of the press 12 in a direction of material flow M, by means of which a flame-retardant liquid 34 can be applied to a first lateral surface S1 of the raw wood-based material panel 16.

In addition, a suction device 36 is arranged downstream of the press 12 in the direction of material flow M, by means of which liquid 34 that has been applied to the first lateral surface S1 is sucked into the raw wood-based material panel 16.

The liquid application device 32 comprises a liquid reservoir 38 as well as a pump 40 by means of which the liquid 34 is guided to at least one nozzle 41 at a liquid pressure $p_{34}$. The nozzle 41 generates a spray 42 that settles on the first lateral surface S1. The nozzle 41 can be part of a nozzle bar 43 that comprises three or more nozzles.

The liquid application device 32 can comprise a temperature control device 43, which keeps the liquid 34 at a given temperature $T_{34}$.

Figure 2:
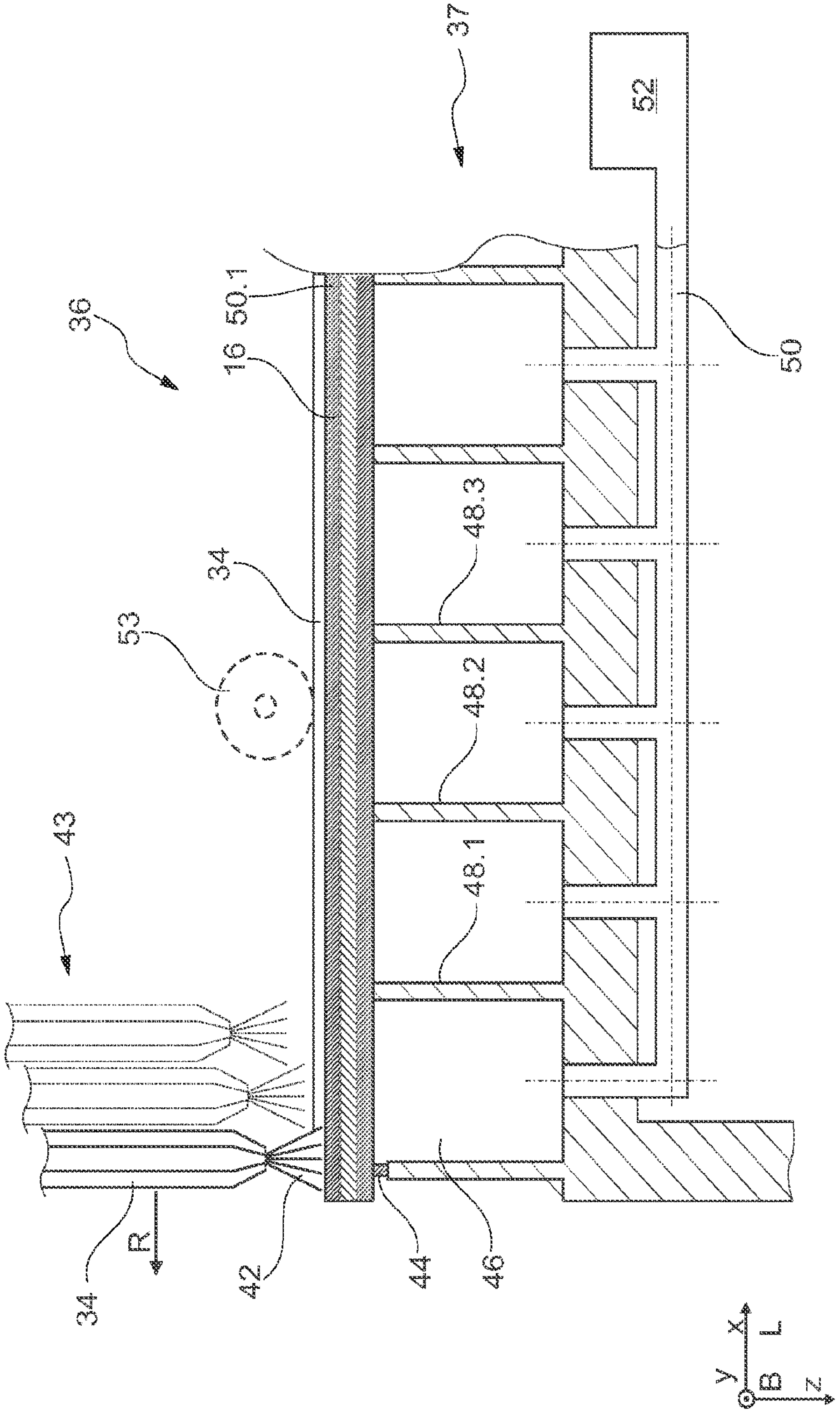
FIG. 2 is a schematic cross-sectional view of a suction device of the wood-based material panel production device according to FIG. 1.

FIG. 2 shows an enlarged view of the suction device 36 which comprises a vacuum table 37 with a circumferential seal 44, by means of which the second lateral surface S2 is sealed against a suction chamber 46. The suction device 36 has supports 48.*j*, (j=1, 2, . . . ) which brace the raw wood-based material panel 16.

The suction chamber 46 is connected to a vacuum pump 52 by means of a vacuum line 49. Preferably, a pressure $p_{46}$ in the suction chamber of less than $p_{46}$=500 hPa is applied to the suction chamber. As a result, the liquid 34 is sucked into a first subsurface 50.1 of the raw wood-based material panel. After a given suction time $t_{saug}$ the suction chamber is ventilated, the raw wood-based material panel 16 rotated, the pressure $p_{46}$ reapplied to the suction chamber and liquid 34 applied to the second lateral surface. The suction chamber is ventilated again after the given suction time $t_{saug}$.

Alternatively or in addition to the nozzle 41, the liquid application device 32 may comprise an application roller 53 or another device for applying the liquid 34 to the first lateral surface S1.

Figures 3, 3A, 3B, 3C:
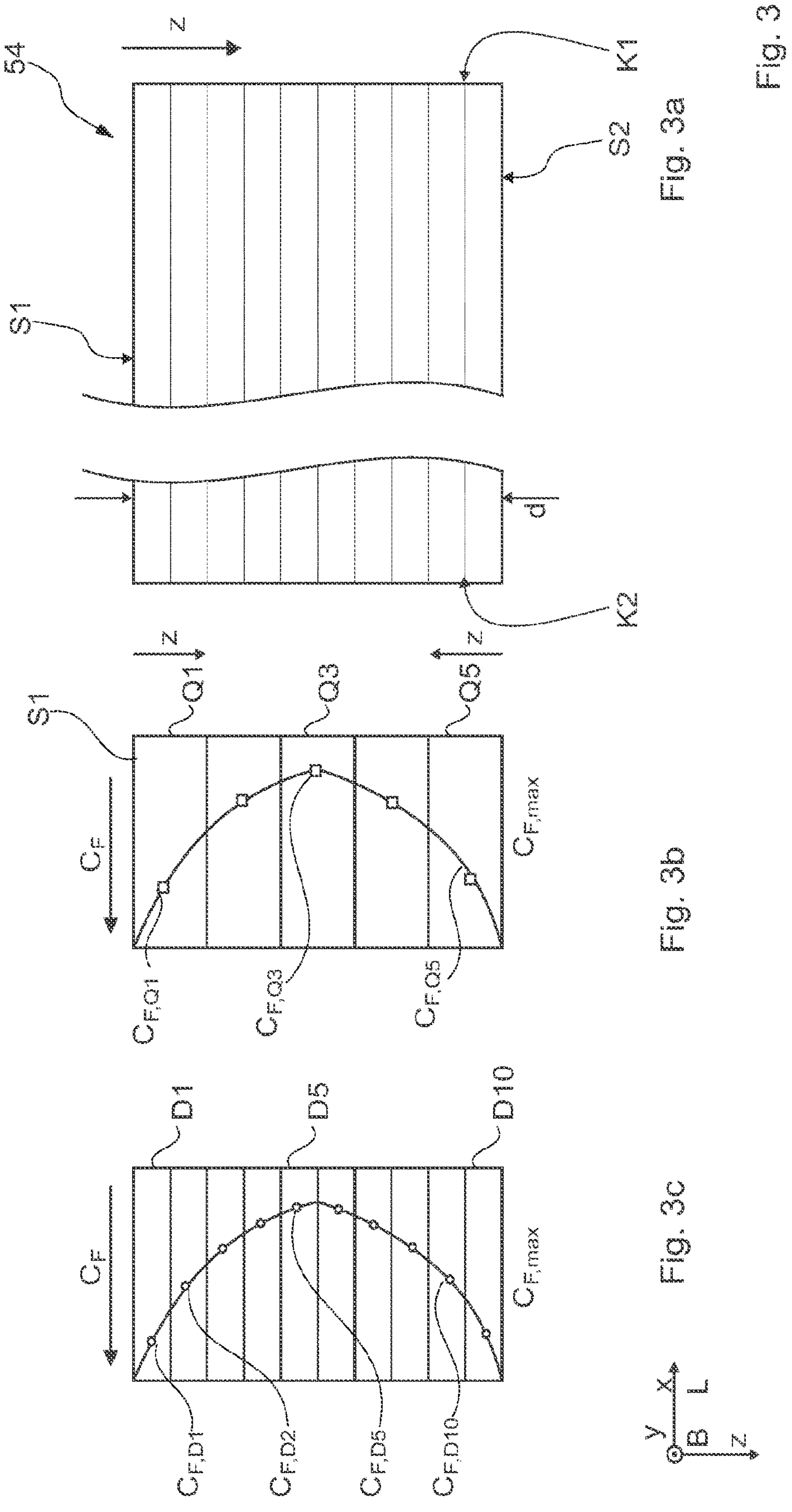
FIG. 3 in each of the partial
FIGS. 3*a*, 3*b* and 3*c*, is a schematic cross-section through a wood-based material panel according to the invention, which has been produced according to the invention.

FIG. 3*a* schematically illustrates a cross-section through a wood-based material panel 54 according to the invention, which has a first edge surface K1 and a second edge surface K2.

FIG. 3*b* shows the course of the concentration $c_{F,54}$ of flame retardant in the wood-based material panel 54 as a function of the distance z from the respective nearest lateral surface. It should be noted that the concentration is highest on the surface. With increasing distance z from the first lateral surface S1 of the wood-based material panel 54 the concentration decreases up to the center of the wood-based material panel 54.

In an inner thickness quintile Q3 the wood-based material panel 54 has an inner concentration $c_{F,Q3}$ of flame retardant. In a first outermost thickness quintile Q1 the wood-based material panel 54 has a first outer concentration $c_{F,Q1}$ of flame retardant. In a second outermost thickness quintile Q5 the wood-based material panel 54 has a second outer concentration $c_{F,Q5}$.

It should be noted that the outer concentration is significantly greater than the inner concentration. In the present case, the following applies: $c_{F,Q3}=0.25\cdot c_{F,Q1}$.

FIG. 3*c* depicts a division into deciles. It should be noted that a second-decile concentration $c_{F,D2}$ of flame retardant in the second thickness decile of the thickness expansion, which lies next to the first outermost thickness decile in the direction of a center of the thickness expansion, is at least 0.1 times a first-decile concentration $c_{F,D1}$ in the first outermost thickness decile.

Figure 4:
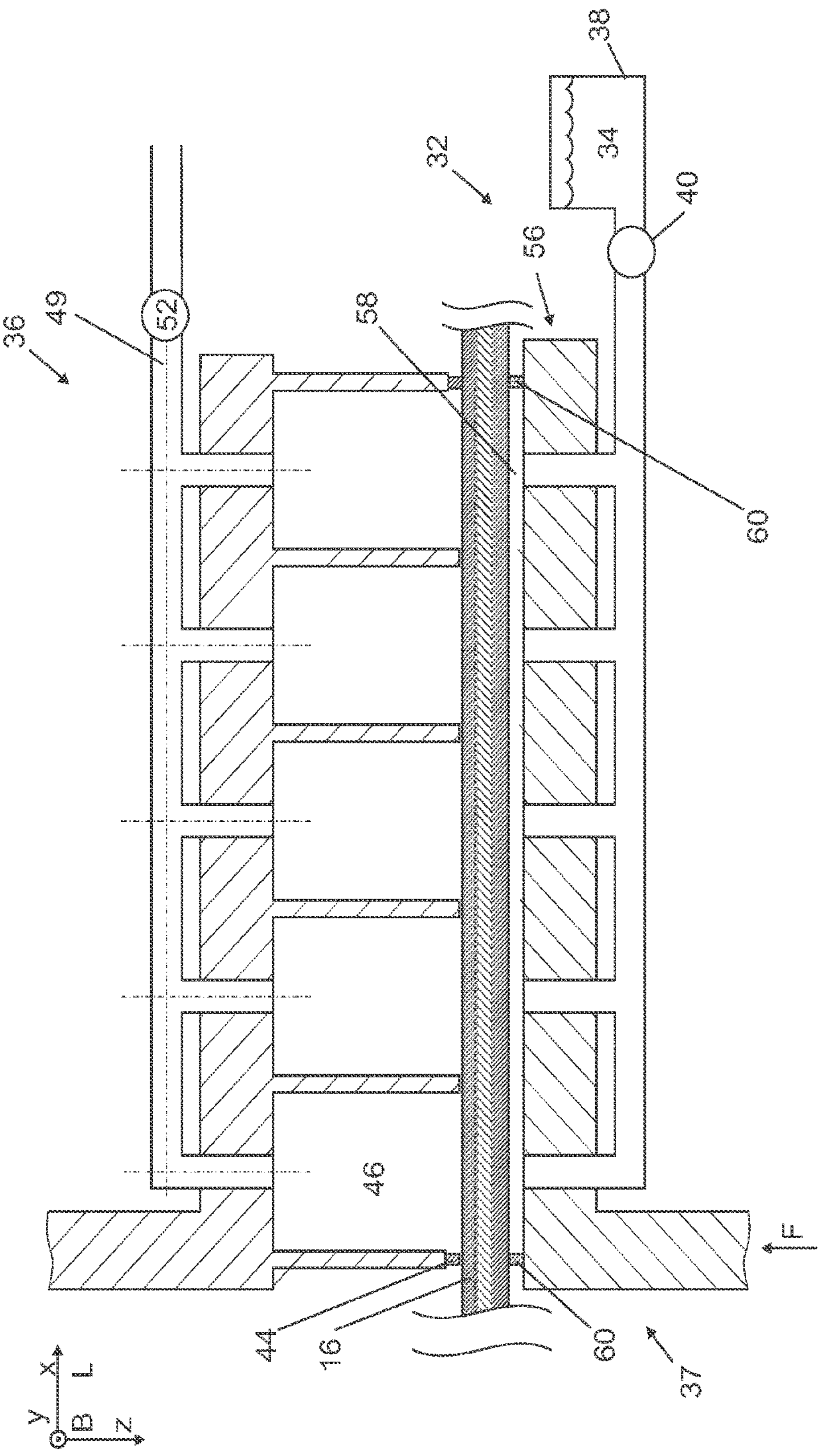
FIG. 4 is a section from a wood-based material panel production device according to the invention in accordance with a second embodiment.

FIG. 4 shows a liquid application device 32 of a wood-based material panel production device 10 according to the invention that comprises a pressure application device 56 which, by means of the pump 40, introduces liquid containing flame retardant 34 from the liquid reservoir 38 into an introduction chamber 58 at an introduction pressure $p_e$. The introduction chamber 58 is limited by a seal 60 of the pressure application device. The pressure application device 56 can be designed to apply the liquid containing flame retardant 34 from below or from above.

A negative pressure can be applied by means of the vacuum pump 52 of the suction device 36 to the raw wood-based material panel 16 via the vacuum line 49. For example, a pressure $p_{46}$ in the suction chamber 46 is at most $p_{46}$=700 hPa. This corresponds to a negative pressure of at least 300 hPa.

Figure 5:
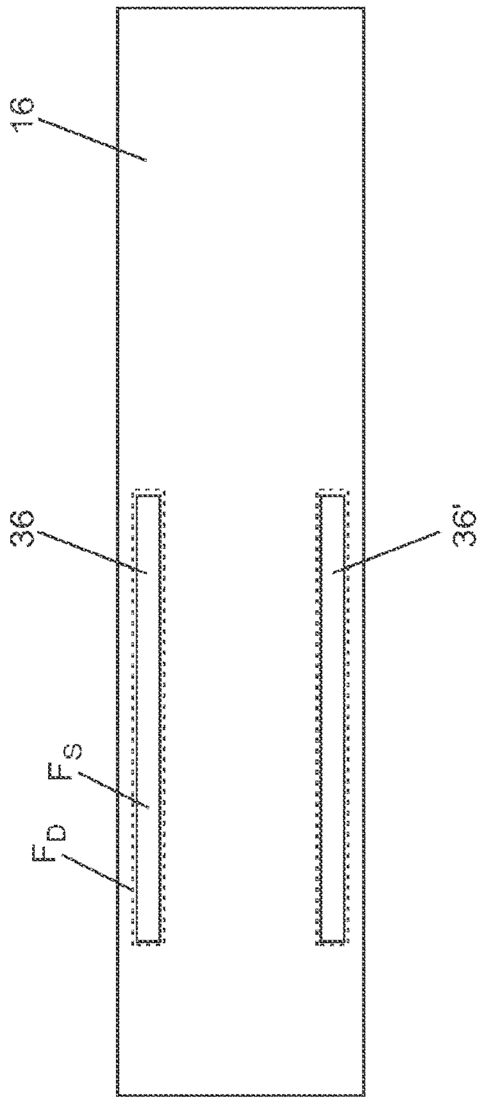
FIG. 5 is a schematic representation of two applicators of the wood-based material panel production device according to FIG. 4.

FIG. 5 schematically shows that the suction device 36 can be configured to apply a local negative pressure. In this case, a suction surface $F_s$ is smaller than the surface of the raw wood-based material panel 16. In the present case, the suction surface $F_s$ is smaller than one tenth of the surface of the raw wood-based material panel 16.

The wood-based material panel production device may also comprise a second suction device 36', which is preferably structurally identical to the first suction device 36.

A pressure surface FD, to which the pressure application device 56 applies the introduction pressure $p_e$, largely corresponds to the suction surface $F_s$, i.e. with a deviation of at most a factor of 2, for example, in particular at most a factor of 1.1, in particular at most a factor of 1.25.

Figure 6A:
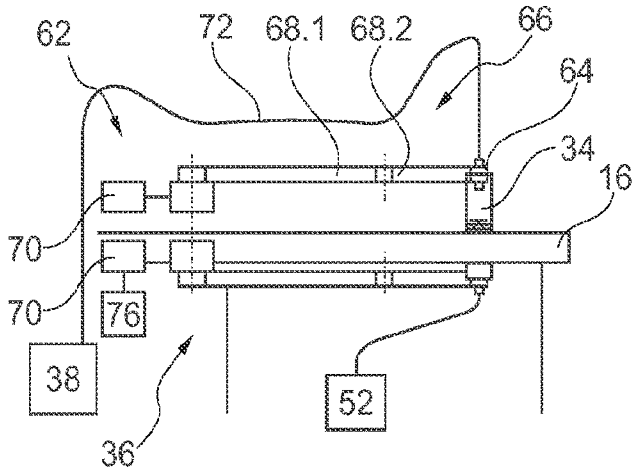
FIG. 6 depicts in the partial FIGS. 6*a* and 6*b* two views of part of a wood-based material production device according to a third embodiment and in the partial FIG. 6*c* a cross-sectional view of part of a wood-based material production device according to a third embodiment.
Figure 6B:
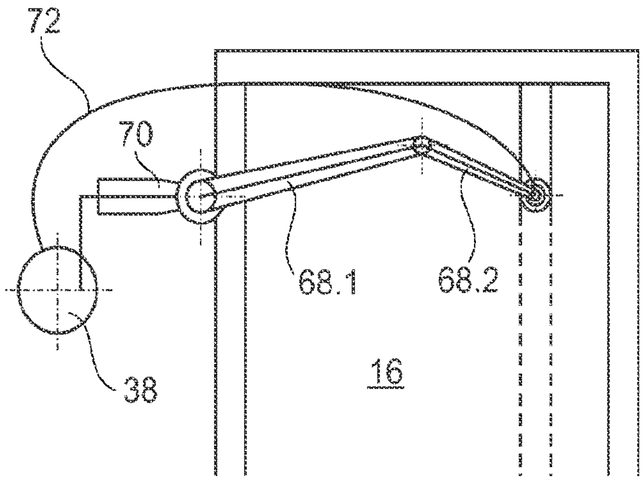

FIG. 6*a* shows a positioning device 62, such as a robot, for positioning an applicator 64 and for pressing the applicator 64 against the raw wood-based material panel 16. For this purpose, the positioning device 62 has an arm 66, for example. The arm 66 may comprise 2 or more partial arms 68.1, 68.2, which can be connected to each other in an articulated manner. By means of a drive 70, the applicator 64 can be automatically positioned to a position relative to the raw wood-based material panel 16, wherein said position can be preset.

The applicator 64 is supplied by means of a flexible line 72 with a pressurized liquid 34, which is sprayed onto the raw wood-based material panel 16 and/or pressed into the raw wood-based material panel 16 under pressure.

Irrespective of the features otherwise specified for the present embodiment, the wood-based material production device 10 can comprise a suction device 36, which has a suction cup 74 that can be positioned at a given point. The suction device 36 is designed in such a way that the suction cup 74 is always positioned opposite the applicator 64. To this end, the drive 70 is controlled by a control unit 76 of the wood-based material panel production device. The suction cup 74 is connected to the vacuum pump 52 by means of a flexible vacuum line.

Figure 6C:
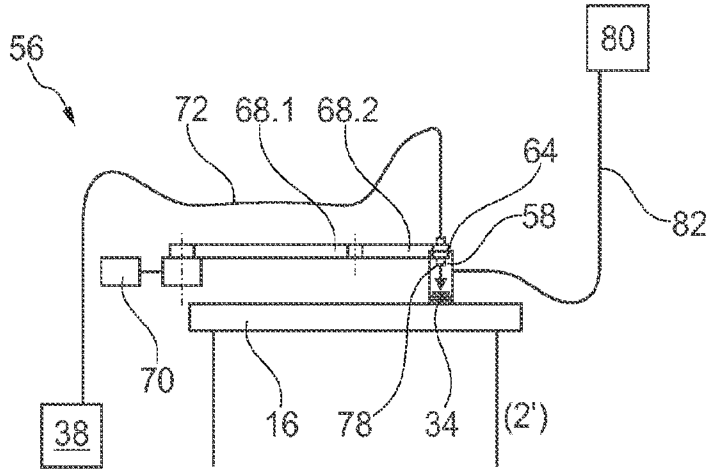

FIG. 6*c* depicts a further embodiment of a pressure application device 56 in which the liquid containing flame retardant 34 is introduced into the introduction chamber 58 by means of a nozzle 78. The introduction pressure $p_e$ can be set by means of a pressure source 80, which is connected to the introduction chamber 58 via a pressure line 82.

It is possible to move the applicator 64 and, if necessary, the suction cup 74 while an overpressure and/or negative pressure is applied. Alternatively, the pressure in the suction chamber and/or the introduction pressure is approximated to the ambient pressure before the applicator and/or the suction cup is moved, in particular completely approximated.

Embodiment Example 1

An unsanded raw wood-based material panel 16 in the form of an OSB panel with a thickness d of d=20 mm was placed on the vacuum table 37. The raw wood-based material panel 16, which had been produced with one percent PMDI binding agent (PMDI: polymeric methylenediphenyl-diisocyanate) more in the surface layers 22.1, 22.3 when compared with a non-flame-retardant wood-based material panel, was treated with a solution of flame retardant Ecoaphos MK 68, 60 percent by weight from Ecoatech in an amount of 0.49 $kg/m^2$ using a nozzle bar.

This corresponds to an amount of 15 percent by weight in relation to the area-specific weight of the top layers 22.1, 22.3. A top layer thickness of the top layers is $d22.1=d_{22.3}=3$ mm±1 mm. A negative pressure of 300 mbar was applied from the lower side. Within $t_{saug}$=120 s±15 s the liquid 34, i.e. the flame-retardant solution, had completely penetrated into the raw wood-based material panel 16.

The raw wood-based material panel 16 was rotated and the method repeated. Samples (base area: DIN A4, sample 1) were subsequently cut out of the raw wood-based material panel 16 and tested together with a conventionally produced flame-retardant OSB panel. The conventionally produced flame-retardant OSB panel had a comparable amount of the aforementioned flame retardant in the surface layer and had been air-conditioned before the test (moisture: approximately 9%). In the process, the samples were flame-treated for different lengths of time using a gas burner positioned at a defined distance from the surface. Once the flame treatment period was over, it was noted whether burning/further burning could be observed and the duration of further burning was determined.

Embodiment Example 2

An unsanded raw wood-based material panel 16 in the form of an OSB panel with a thickness d=20 mm (raw density approximately 650 kg/$m^3$) was placed on the vacuum table 37, which was fitted with the circumferential seal 44. The raw wood-based material panel 16, which had been produced with one percent more binding agent (PMDI) in the surface layer, was treated with a solution of a flame retardant from Ecoatech (Ecoaphos MK 68, 60 percent by weight) in an amount of 0.49 kg/$m^2$ using the nozzle bar 43. The solution of the flame retardant had been previously heated to approximately $T_{34}$=60° C. to facilitate penetration.

The amount of liquid corresponds to an amount of 15 percent by weight in terms of the surface layer strand (thickness of the surface layer approximately 3 mm per side). A vacuum of 150 mbar was applied from the lower side. After a suction time of $t_{saug}$=90 seconds the flame-retardant solution had completely penetrated into the raw wood-based material panel 16. The raw wood-based material panel 16 was rotated and the method repeated.

16 samples (DIN A4, sample 2) were subsequently also cut out of this raw wood-based material panel 16 and likewise tested for flammability in accordance with DIN EN 13823:2015 together with a conventionally produced flame-retardant OSB panel.

The conventionally produced OSB panel had a comparable amount of the aforementioned flame retardant in the surface layer and had been air-conditioned before the test (moisture: approximately 9%).

When testing for flammability, the samples were flame-treated for different lengths of time according to the left-hand column of the following table using a gas burner positioned at a defined distance from the surface. Once the flame treatment period was over, it was noted whether burning/further burning and the duration of further burning could be observed.

TABLE 1

| Observations following flame treatment | | | |
|---|---|---|---|
| Duration of flame treatment | Reference (conventionally manufactured OSB) | Sample 1 | Sample 2 |
| 2 min | No further burning | No further burning | No further burning |
| 4 min | No further burning | No further burning | No further burning |
| 8 min | No further burning | No further burning | No further burning |
| 12 min | No further burning | No further burning | No further burning |
| 15 min | No further burning | No further burning | No further burning |

As can be seen from the flame treatment trials, wood-based material panels produced using a method according to the invention perform just as well as the reference panel. Even after 15 minutes of flame treatment, none of the samples exhibited further burning after the burner had been deactivated. The subsequent examination showed that the wood-based material panels produced according to the invention exhibited an even higher strength after testing. In the case of the reference panel, individual charred strands could be easily removed from the structure mechanically, which was only possible with greater effort in the case of the two wood-based material panels produced according to the invention.

Embodiment Example 3

An unsanded raw wood-based material panel 16 in the form of an HDF panel with a thickness d=8 mm (raw density approximately 850 kg/$m^3$) was placed on the vacuum table 37, which was fitted with the circumferential seal 44. The raw wood-based material panel 16, which had been produced with one percent more binding agent based on a urea-formaldehyde adhesive, was treated with a solution of a flame retardant from Ecoatech (Ecoaphos MK 68, 50 percent by weight) in an amount of 0.31 kg/$m^2$ using the nozzle bar 43. The proportion of binding agent was also increased in this panel (2% more than the standard). The solution of the flame retardant had been previously heated to approximately $T_{34}$=60° C. to facilitate penetration.

Via the liquid, an amount of flame retardant was introduced into the wood-based material panel that constituted 15 percent by weight in relation to the surface layer (thickness of the surface layer approximately 1.2 mm per side). A vacuum of 150 mbar was applied from the lower side. After a suction time of $t_{saug}$=120 seconds the flame-retardant solution had completely penetrated into the raw wood-based material panel 16. The raw wood-based material panel 16 was rotated and the method repeated.

16 samples (DIN A4, sample 2) were subsequently cut out of this wood-based material panel 16 and tested for flammability in accordance with DIN EN 13823:2015 together with a conventionally produced flame-retardant HDF panel.

The conventionally produced wood-based material panel had a comparable amount of the aforementioned flame retardant in the panel and had been air-conditioned before the test (moisture: approximately 9%).

When testing for flammability, the samples were tested in exactly the same way as the OSB. The results in terms of flammability and strength after the fire test were comparable to those of the OSB test.

Embodiment Example 4

The steps carried out for embodiment 3 were carried out for an unsanded raw wood-based material panel 16 in the form of an MDF panel with a thickness d=8 mm (raw density approximately 750 kg/$m^3$).

When testing for flammability, the samples were tested in exactly the same way as a conventionally produced MDF panel. The MDF panel produced according to the invention achieved or exceeded the results in terms of flammability and strength when compared to the conventionally produced MDF panel.

Embodiment Example 5

The steps carried out for embodiment 3 were carried out for an unsanded raw wood-based material panel 16 in the form of a chipboard with a thickness d=8 mm (raw density approximately 650 kg/$m^3$).

When testing for flammability, the samples were tested in exactly the same way as a conventionally produced chipboard. The chipboard produced according to the invention achieved or exceeded the results in terms of flammability and strength when compared to the conventionally produced chipboard.

Embodiment Example 6

The steps carried out for embodiment 3 were carried out for an unsanded raw wood-based material panel 16 in the form of insulating board with a thickness d=20 mm (raw density approximately 250 kg/m$^3$).

When testing for flammability, the samples were tested in exactly the same way as a conventionally produced insulating board. The insulating board produced according to the invention achieved or exceeded the results in terms of flammability and strength when compared to the conventionally produced insulating board.

The invention claimed is:

1. A method for producing a wood-based material panel, comprising:

(a) producing a raw wood-based material panel that comprises a first lateral surface, a second lateral surface that extends parallel to the first lateral surface, and edge surfaces that connect the first and second lateral surfaces to each other, (b) applying a liquid containing a flame retardant to at least the first lateral surface, and (c) applying a negative pressure to the second lateral surface so that the liquid containing flame retardant is sucked into a subsurface of the raw wood-based material panel and/or applying an overpressure to the first lateral surface so that the liquid containing flame retardant is pressed into a subsurface of the raw wood-based material panel, resulting in the wood-based material panel, (d) wherein the liquid is an aqueous solution or suspension, and (e) at a point where the liquid containing flame retardant is applied, the concentration of flame retardant in the liquid at the surface temperature of the first lateral surface is higher than a saturation concentration of the flame retardant in the liquid.

2. The method according to claim 1, further comprising:

(a) pressing an applicator against the raw wood-based material panel so that an introduction chamber forms between the applicator and the raw wood-based material panel that is sealed by a seal of the applicator, (b) pressing liquid containing flame retardant into the introduction chamber, and (c) subsequently reducing an introduction pressure in the introduction chamber.

3. The method according to claim 2, further comprising:

(d) after reducing the introduction pressure, moving the applicator relative to the raw wood-based material panel, (e) re-pressing the applicator against the raw wood-based material panel, (f) pressing the liquid containing flame retardant into the introduction chamber, (g) reducing the introduction pressure in the introduction chamber to the ambient pressure and (h) repeating the steps above until the raw wood-based material panel is equipped with flame retardant.

4. The method according to claim 1, wherein the negative pressure is applied (a) from above and/or (b) by a suction cup, to a suction surface, which corresponds to a pressure surface, that the liquid containing flame retardant is pressed into.

5. The method according to claim 2, wherein (a) the applicator is moved relative to the raw wood-based material panel while the liquid containing flame retardant is being pressed in and/or (b) the raw wood-based material panel is moved and the applicator is moved with it.

6. The method according to claim 1, wherein the negative pressure is applied in such a way that an inner concentration of flame retardant in an inner thickness quintile of a thickness expansion from the first lateral surface to the second lateral surface is at most 0.8 times an outer concentration in a first outermost thickness quintile that extends to the first lateral surface.

7. The method according to claim 1, wherein:

(a) a concentration of flame retardant in the liquid corresponds to at least 65% of the solubility of the flame retardant, and/or (b) a concentration of flame retardant in the liquid is at least 50 percent by weight.

8. The method according to claim 1, wherein the liquid contains at least one coloring agent which is selected in such a way that a flame retardant content can be determined from a color of the wood-based material panel in a cross-section.

9. The method according to claim 1, wherein:

(a) a liquid temperature of the liquid during application onto the lateral surface is at least 40° C., in particular at least 50° C., and/or (b) a surface temperature of the first lateral surface during application of the liquid is at most 50° C.

10. The method according to claim 1, wherein at a point where the liquid containing flame retardant is applied, the surface temperature of the first lateral surface is lower than the liquid temperature.

11. The method according to claim 1, further comprising: applying the liquid containing flame retardant so that the moisture gradient is reduced.

12. The method according to claim 1, wherein the negative pressure is at least 300 hPa.

13. The method according to claim 1, further comprising (a) rotating the raw wood-based material panel after the liquid has been introduced into the subsurface of the first lateral surface, (b) applying the liquid to the second lateral surface and (c) applying the negative pressure to the first lateral surface so that the liquid is sucked into a subsurface of the second lateral surface of the raw wood-based material panel, resulting in the wood-based material panel.

14. The method according to claim 1, further comprising:

(a) scattering a first surface chip layer, (b) scattering at least one middle chip layer arranged on the latter, and (c) scattering a second surface chip layer arranged on the middle chip layer, (d) pressing the layers to form the raw wood-based material panel, which comprises a first surface layer resulting from the first surface chip layer, a middle layer resulting from the middle chip layer, and a second surface layer resulting from the second surface chip layer, and (e) applying the liquid containing flame retardant with an area-specific application amount of liquid that corresponds to at least 10 percent by weight of an area-specific mass of the first surface layer.

15. A method for producing a wood-based material panel, comprising:

(a) producing a raw wood-based material panel that comprises a first lateral surface, a second lateral surface that extends parallel to the first lateral surface, and edge surfaces that connect the first and second lateral surfaces to each other, (b) applying a liquid containing a flame retardant to at least the first lateral surface, (c) applying a negative pressure to the second lateral surface so that the liquid containing flame retardant is sucked into a subsurface of the raw wood-based material panel, and/or (d) applying an overpressure to the first lateral surface so that the liquid containing flame retardant is pressed into a subsurface of the raw wood-based material panel, resulting in the wood-based material panel, (e) wherein the liquid is an aqueous solution or suspension, and (f) a concentration of flame retardant in the liquid corresponds to at least half of the solubility of the flame retardant.

16. The method according to claim 1, wherein the liquid is an aqueous solution or an aqueous suspension.

17. The method according to claim 1, wherein a concentration gradient of flame retardant reduces as a distance from a surface to a center of the wood-based material panel increases.

18. The method according to claim 15, comprising (a) pressing the raw wood-based material panel, so that the raw wood-based material panel loses water in the subsurface due to evaporation and has a moisture gradient, and (b) applying the liquid containing flame retardant so that the moisture gradient is reduced, (c) wherein the area-specific application amount of liquid is selected in such a way that a surface layer moisture level of a surface layer of the wood-based material panel deviates from a core moisture level by at most 30%.

19. The method according to claim 15, wherein the negative pressure is applied in such a way that an inner concentration of flame retardant in an inner thickness quintile of a thickness expansion from the first lateral surface to the second lateral surface is at most 0.8 times an outer concentration in a first outermost thickness quintile that extends to the first lateral surface.

20. The method according to claim 11, wherein the area-specific application amount of liquid is selected in such a way that a surface layer moisture level of a surface layer of the raw wood-based material panel deviates from a core moisture level by at most 30%.

* * * * *